United States Patent
Yuan et al.

(10) Patent No.: US 7,216,061 B2
(45) Date of Patent: May 8, 2007

(54) APPARATUS AND METHODS FOR DETECTING SYSTEM FAULTS USING HIDDEN PROCESS DRIVERS

(75) Inventors: Chao Yuan, Plainsboro, NJ (US); Claus Neubauer, Monmouth Junction, NJ (US); Zehra Cataltepe, Red Bank, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 11/210,486

(22) Filed: Aug. 24, 2005

(65) Prior Publication Data

US 2006/0047482 A1    Mar. 2, 2006

Related U.S. Application Data

(60) Provisional application No. 60/604,300, filed on Aug. 25, 2004.

(51) Int. Cl.
*G06F 15/00* (2006.01)
(52) U.S. Cl. ...................... 702/185; 702/183
(58) Field of Classification Search ............... 702/182, 702/184, 183, 185
See application file for complete search history.

(56) References Cited

U.S. PATENT DOCUMENTS

| | | | |
|---|---|---|---|
| 5,335,291 A * | 8/1994 | Kramer et al. ............. 382/158 |
| 6,014,598 A | 1/2000 | Duyar et al. |
| 6,393,373 B1 | 5/2002 | Duyar et al. |
| 6,594,620 B1 | 7/2003 | Qin et al. |
| 6,687,585 B1 | 2/2004 | Rizzoni et al. |
| 6,766,230 B1 | 7/2004 | Rizzoni et al. |
| 2002/0152056 A1* | 10/2002 | Herzog et al. ................. 703/2 |
| 2002/0183971 A1* | 12/2002 | Wegerich et al. ........... 702/185 |

* cited by examiner

*Primary Examiner*—John E. Barlow, Jr.
*Assistant Examiner*—Douglas N Washburn (57) ABSTRACT

An apparatus for detecting faults in a system monitored by a plurality of sensors is provided. The apparatus includes a hidden process driver unit that generates a hidden process driver based upon sensor values received from a group of correlated sensors selected from among the plurality of sensors. The apparatus also includes a sensor estimating unit that generates sensor estimates for each of the plurality of sensors based upon the hidden process driver and a known process driver provided by an uncorrelated sensor. The apparatus further includes a fault determining unit that indicates a fault when a residual based upon a difference between a sensor value supplied by one of the plurality of sensors and a corresponding one of the sensor estimates lies outside an acceptable range of residual values.

15 Claims, 7 Drawing Sheets

APPARATUS AND METHODS FOR DETECTING SYSTEM FAULTS USING HIDDEN PROCESS DRIVERS

CROSS-REFERENCE TO RELATED APPLICATIONS

This application claims the priority of U.S. provisional patent application No. 60/604,300, titled "SYSTEM AND METHOD FOR SENSOR ESTIMATION," filed Aug. 25, 2004.

FIELD OF THE INVENTION

The present invention is related to the field of sensor-based monitoring, and, more particularly, to monitoring multi-element systems using multiple sensors.

BACKGROUND OF THE INVENTION

Multi-element systems such as a power plant can involve the complex integration of multiple elements cooperatively performing a variety of tasks in order to attain a desired system performance or system output. Given the complexity of many such systems, it is not surprising that the task of monitoring the performance of a complex system can be difficult. Often times, especially in systems like a power plant, the paramount reason for monitoring is to detect conditions that could lead to a system failure. The objective, of course, is to detect the conditions early enough so that they can be ameliorated before a failure occurs.

One monitoring technique in such an environment is to use multiple sensors to detect and monitor the operation or performance of a complex system. Sensor-based monitoring can be used for efficient control in a variety of industrial settings, including power generating systems, manufacturing processes, and a host of other industrial operations involving the coordinated functioning of large-scale, multi-component systems. Indeed, sensor-based monitoring can be advantageously employed in virtually any environment in which various system-specific parameters need to be monitored over time and for a variety of conditions.

Sensor-based monitoring stems from the view that a power plant or other complex system is a multiple-input, multiple output (MIMO) system. According to this view multiple inputs, or process drivers, are supplied to the MIMO system, and based on the inputs, the MIMO system generates output. In the context of a power generation system, for example, the process drivers include gas and air, with which various output are produced. The outputs include not only power, but also other outputs that can be measured, such as temperature, pressure, and vibration. Both the inputs and the resulting outputs can be monitored with the right kind of sensors appropriately positioned relative to the system.

Related to sensor-based monitoring generally, new techniques have been advanced in recent decades for detecting system faults using model-based fault detection. The underlying idea of many such techniques it that of analytical redundancy as opposed to physical redundancy. The latter approach utilizes redundant sensors, whereas the former approach utilizes signals representing estimated values generated in accordance with a mathematical model of the system. The estimated values are compared to actual measurements obtained by sensors, giving rise to residuals—the difference (typically an absolute value) between the estimated and actual values generated by the sensors. The residual values, in turn, are compared with threshold values. A system fault is indicated if a residual lies outside an acceptable range of values. Thus, system diagnosis and fault detection is based on a comparison of prior information represented by the system model with actual measurements. The model itself can be determined using, for example, statistical methods such as regression.

Owing to system complexity, however, the accuracy of even these more advanced techniques can be reduced when less than all of the inputs are known or accurately modeled. For example, with respect to a turbine engine or generator, humidity can be a very important input into the system, but in many circumstances, is not measured. Using only partial information in a regression or other model-building procedure can produce a less accurate model.

One solution to the problem has been to utilize known or estimated correlations among sensors that measure an output of the MIMO system. For example, in monitoring a combustion turbine engine, all N-blade path temperature sensors are sufficiently correlated so that one such sensor can be used to predict the value of another. Different techniques for inferential sensing have been proposed and tested. These include auto-associative neural networks, non-parametric kernel regression, multivariate state regression, and support vector regression. According to these techniques, one correlated sensor is a MIMO system output which is regressed on the other correlated sensors whose sensor values represent inputs.

One persistent problem, even with these more advanced techniques, however, is the problem of spillover. Spillover can occur if any of the input correlated sensors is faulty or otherwise inaccurate. The result is that the resulting model and system monitoring capability are reduced accordingly. Current monitoring devices and techniques have not adequately addressed this problem.

SUMMARY OF THE INVENTION

The present invention provides a system and related methods for detecting faults in a system using one or more hidden process drivers. One advantage of the invention is the mitigation or elimination of the spillover problem inherent in many conventional estimation techniques used for monitoring systems such as power generators, processing plants, and other complex, multiple input—multiple output (MIMO) systems.

One embodiment of the invention is an apparatus for detecting faults in a system monitored by a plurality of sensors. The apparatus can include a hidden process driver unit that generates at least one hidden process driver based upon sensor values received from at least one group of correlated sensors selected from among the plurality of sensors. The apparatus also can include a sensor estimating unit that generates at least one sensor estimate based upon the at least one hidden process driver and at least one known process driver provided by at least one uncorrelated sensor. The apparatus further can include a fault determining unit that indicates a fault when a residual based upon a difference between a sensor value supplied by one of the plurality of sensors and a corresponding one of the sensor estimates lies outside a predetermined acceptable range of residual values.

Another embodiment of the invention is a method for detecting faults in a system. The method can include grouping a plurality of sensors communicatively linked with the system into at least one group of correlated sensors based upon a measure of correlation between the plurality of sensors. Additionally, the method can include generating a hidden process driver for the at least one group of correlated sensors based upon a functional relationship between the process driver and a set of sensor values produced by each of the correlated sensors. The method also can include generating a sensor estimate based upon at least one known process driver and the hidden process driver corresponding to the at least one group of correlated sensors. The method further can include detecting a fault when a residual based on a difference between a sensor value produced by a particular one of the plurality of sensors and a sensor estimate corresponding to that particular sensor lies outside a predetermined acceptable range of residuals for the particular sensor.

Yet another embodiment of the invention is a method of estimating values of sensors used in monitoring a system. The method can include grouping a plurality of sensors communicatively linked with the system into at least one group of correlated sensors based upon a measure of correlation between the plurality of sensors. The method additionally can include generating a hidden process driver for the at least one group of correlated sensors based upon a plurality of inverse sensor functions and confidence weights, each of the plurality of inverse sensor functions and confidence weights uniquely corresponding to a different one of the group of correlated sensors. The method further can include generating a sensor estimate based upon at least one known process driver and the hidden process driver corresponding to the at least one group of correlated sensors.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

The present invention provides a mechanism for monitoring a system. More particularly, the invention enables the detection of signals indicative of a possible or impending fault in the system. Accordingly, action can be taken to mitigate fault-causing conditions before a disruptive fault occurs.

One aspect of the invention is that it allows for the substitution of a correlated sensor measurement for those of a plurality of correlated sensors, as explained herein. A particular advantage of this aspect of the invention is that it reduces or eliminates the spillover problem inherent in conventional fault detection devices using standard system models. A closely related advantage is that invention provides more accurate monitoring in so far as the underlying system model better accounts for unknown or unmeasured inputs into the system that is being monitored.

Figure 1:
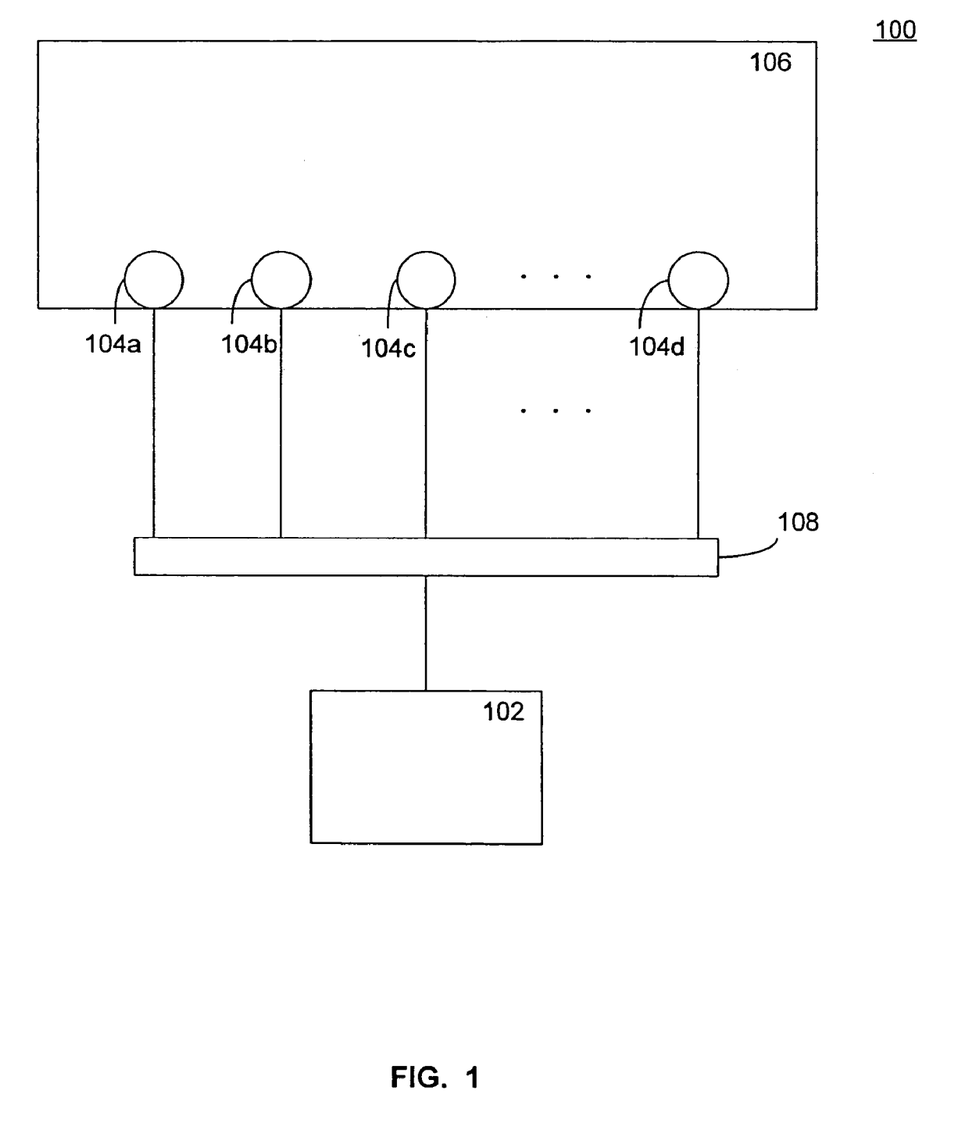
FIG. 1 is a schematic diagram of a complex-system environment that includes an apparatus for performing sensor estimation, according to one embodiment of the present invention.

Referring initially to FIG. 1, a complex-system environment 100 that includes a fault-detection apparatus 102 for detecting system faults according to one embodiment of the invention is schematically illustrated. As illustrated, the apparatus communicatively links to a plurality of sensors 104*a*–*d*. The sensors, as further illustrated, are positioned to sense inputs to and outputs of a system 106 that is part of the complex-system environment 100. The number of sensors employed to monitor the system 106 can be very large. In some embodiments, a hundred or more sensors can be utilized. Indeed, in still other embodiments, several hundred sensors can be employed. Of course a much smaller number of sensors alternately can be utilized, and it will be apparent from the description herein that the number of sensors utilized does not affect the operation of the fault-detection apparatus 102.

The plurality of sensors illustratively connect to the fault-detection apparatus 102 through an interface 108. The interface 108 can include one or more analog-to-digital converters that receive analog signals generated by the sensors in response to sensed physical activity in the system 106, digitizes the signals, and conveys the resulting digital signals to the fault detection apparatus 102.

The system 106 illustratively defines a power generation system. It will be readily apparent from the ensuing discussion, however, that the system 106 can comprise other types of systems generally characterized as comprising various components that cooperatively function to produce one or more outputs based on a plurality of inputs. Thus, for example, the system 106 alternately can comprise a manufacturing plant, electrical network, or other multi-element system.

The sensors 104*a*–*d* can comprise various types of transducers capable of transforming a physical phenomenon into an electrical signal. As will be readily understood by one of ordinary skill in the art, one or more of the sensors 104*a*–*d* converts energy in one form into electrical energy. For example, in the exemplary context of a power generation system, one or more of the sensors 104*a*–*d* can be a temperature sensor which generates an electrical signal, the current or voltage of which is commensurate with the level of heat energy sensed by the sensor. More particularly, one or more of the sensors can be part of a set of N-blade path temperature sensors. Similarly, in the context of monitoring a power generation system, the sensors 104*a*–*d*, additionally or alternatively, can include pressure sensors and/or sensors for detecting vibration within the power generation system.

Figure 2:
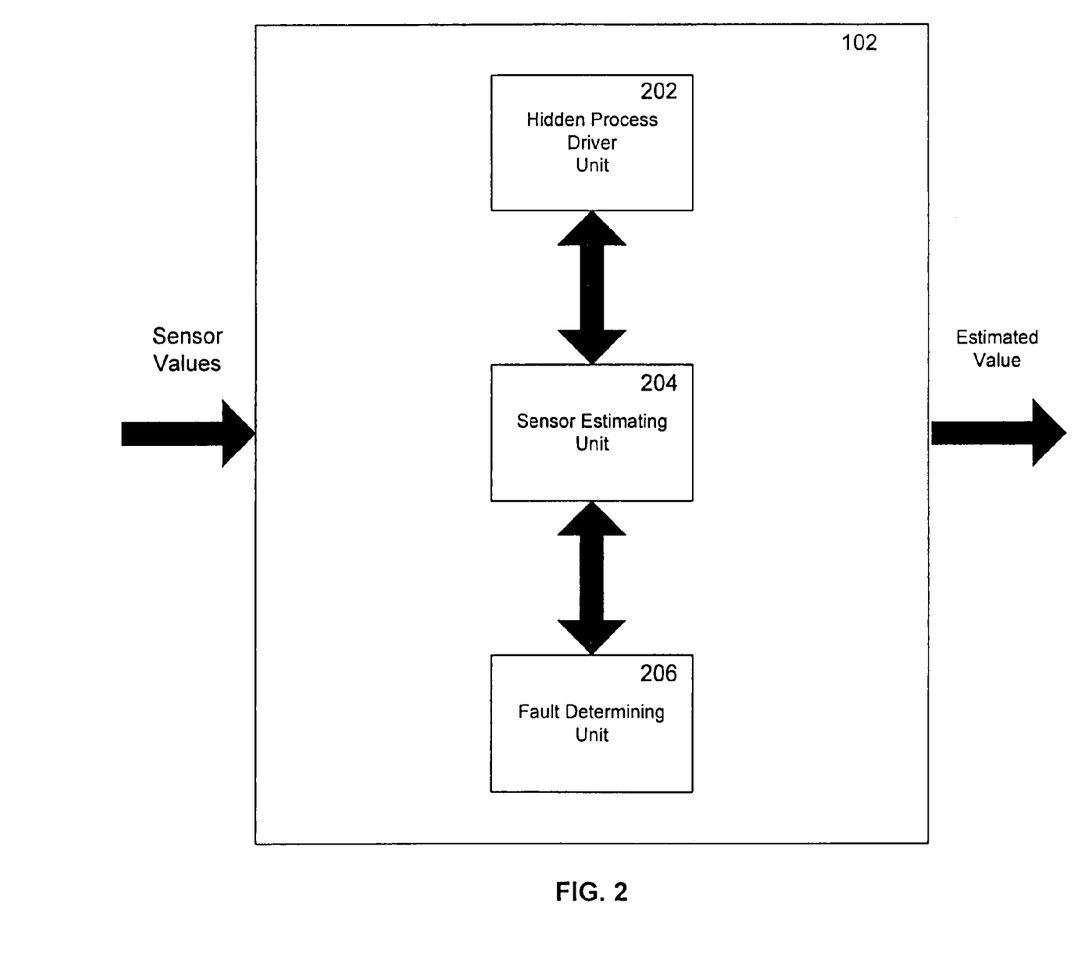
FIG. 2 is a schematic diagram of a fault-detection apparatus, according to another embodiment of the present invention.

Referring additionally now to FIG. 2, the fault-detection apparatus 102, according to one embodiment, illustratively includes a hidden process driver unit 202. Illustratively, the apparatus 102 further includes a sensor estimating unit 204 in electrical communication with the hidden process driver unit 202. The apparatus 102 also illustratively includes a fault determining unit 206 in electrical communication with the sensor estimating unit 204.

One or more of the units—the hidden process driver unit 202, sensor estimating unit 204, and/or the fault determining unit 206—can be implemented in one or more dedicated circuits. Alternatively, one or more of the units can be implemented in machine-readable code configured to run on a general-purpose computer or an application-specific computing device. According to still another embodiment, one or more of the units is implemented as a combination of hardwired circuitry and machine-readable code.

Functionally, the hidden process driver unit 202 generates at least one hidden process driver. The hidden process driver, as explained more particularly below, is based upon sensor values received from at least one group of correlated sensors that have been selected from among the plurality of sensors 104a–d. A group of correlated sensors comprises sensors whose values exhibit a sufficiently high degree of correlation as measured, for example, by a statistics-based measurement such as the correlation coefficient.

As also explained more particularly below, the hidden process driver is conveyed to the sensor estimating unit 204 along with one or more sensor values supplied from sensors that are uncorrelated. The sensor values that are obtained from uncorrelated sensors define known process drivers. The sensor estimating unit 204 generates sensor estimates for each of the plurality of sensors 104a–d based upon the at least one hidden process driver and at least one known process driver.

A fault that could potentially lead to a failure in the system 106 is detected by the fault determining unit 206. A fault is indicated whenever a residual, which is the difference between a sensor value supplied by one of the plurality of sensors and a corresponding one of the sensor estimates, lies outside a predetermined acceptable range of residual values.

The hidden process driver unit 202 determines a hidden process driver, t, based on sensor functions, $f_i$, for each of the i sensors, $1 \leq i \leq N$, that belong to a particular group of correlated sensors for which the hidden process driver is to be determined. The sensor function is assumed to have a parametric form according to which the sensor value, $x_i$, generated by the i-th sensor is a function of the hidden process driver that is to be determined; that is, $x_i = f_i(t)$. The function can be a linear function defined as $x_i = f_i(t) = a_i t + b_i$ in which the parameters comprise a scaling component, $a_i$, and a dc component, $b_i$, both unique for the particular sensor for which the function is defined. Alternative parametric forms include quadratic functions and exponential functions, for example.

In each instance, the parameters of the different functions can be computed, for example, using least-square methods applied to a set of training data generated by the sensors. The technique is particularly suited in circumstances in which each of the sensors belonging to the particular group of correlated sensors is assumed to be well functioning.

An alternative technique for ascertaining sensor functions, $f_i$, for each of the i sensors, $1 \leq i \leq N$, assumes a non-parametric form for each of the sensor functions. According to this technique, a j-th sensor value is selected, $j=1,2,\ldots,N$, such that for each sensor, $x_i = f_i(x_j) = f_i(t)$. The technique using non-parametric forms can be used to cope with complicated correlation relationships among the correlated sensors, and is well suited if any of the sensors are not well functioning.

An estimate of the hidden process driver, t, can be obtained from each of the i sensors based on the corresponding sensor values, $x_i$, and the inverses of each of the corresponding sensor functions, $f_i^{-1}$; that is, for the i-th sensor, the estimated hidden process driver is computed as $t = f_i^{-1}(x_i)$. If a function can not be inverted to determine $f_i^{-1}$, then the process driver, t, can be divided into several discrete segments such that the particular sensor function, $f_i$, is invertible with each segment. Either the function, $f_i$, or the inverse function, $f_i^{-1}$, can be approximated on the basis of segmented linear functions computed from a set of training data generated by the sensors.

Because an estimate of the hidden process driver is generated by each sensor in the particular group of the sensors 104a–d determined to be correlated with one another, there is generated one estimate for each sensor in the particular group of correlated sensors. Accordingly, if a correlated group of sensors comprises N correlated sensors, then N estimates of the hidden process driver are generated for that particular group of correlated sensors. The hidden process driver, t, corresponding to a particular group of correlated sensors can thus be computed as a weighted average according to the following equation:

$$t = \sum w_i f_i^{-1}(x_i),$$

where $f_i^{-1}$ is the inverted sensor function for the i-th sensor of a group of N correlated sensors, $x_i$ is the sensor value of the i-th sensor, and $w_i$ is a sensor-specific weight corresponding to the i-th sensor such that $$\sum_{i=1}^{N} w_i = 1.$$

The weights can be determined iteratively during a training phase using training data comprising multiple sensor values generated by each of the N sensors. Each $w_i$ is iteratively revised based on a residual difference between the i-th sensor value and its estimate. If the absolute value of the residual difference is greater than a predetermined threshold, then the weight, $w_i$, is decreased; otherwise, the weight is increased subject to the constraint that $$\sum_{i=1}^{N} w_i = 1.$$

More particularly, each of the i weights can be computed as follows:

$$w_k = \frac{g(|\hat{x}_k - x_k|)}{\sum_{i=1}^{N} g(|\hat{x}_i - x_i|)},$$

where $g(\cdot)$ is a decreasing error function defined over the domain $[0, +\infty)$ and yields a value in the range $[0,1]$. The decreasing error function, $g(\cdot)$, can be, for example, a Gaussian function. Alternatively, the decreasing error function, $g(\cdot)$, can be one of a class of segmented linear functions.

Taking the weighted average of the estimates of the hidden process driver corresponding to a particular group of correlated sensors reduces the effects of model error and noise. The robustness of the procedure, moreover, is enhanced relative to conventional procedures. If any one of the N sensors is faulty or otherwise suspect, then this can be reflected in that sensor's weight; that is, if the k-th sensor is faulty or otherwise functioning poorly, then the weight, $w_k$, is reduced relative to the others accordingly. Therefore, adverse effects of spillover are mitigated or eliminated.

The fault-detection apparatus 102 can be configured to operate in two sequential phases, termed the training phase and the monitoring phase. During the training phase, training data is generated by the plurality of sensors 104a–d and used by the hidden process driver unit 10 to compute inverse functions for each sensor belonging to a group of correlated sensors. The training data can also be used during the training phase to determine or "train," as understood by those of ordinary skill in the art, the model by which sensor estimates are computed using known and hidden process drivers. More particularly, the model so trained using the sensor-generated training data can comprise a standard regression model. During the training phase the confidence weights, $w_i$, i=1,2, . . . N, are arbitrarily assigned equal weight subject to the constraint that $$\sum_{i=1}^{N} w_i = 1.$$

Algorithmically, the training phase comprises the following two steps:

Step 1
For i=1,2, . . . N, compute $f_i^{-1}$ for each of the N sensors belonging to a group of correlated sensors; and Step 2
For i=1,2, . . . N, initialize $w_i$ for each of the N sensors belonging to a group of correlated sensors such that $w_i$=1/N, i=1,2, . . . N, and use training data to train the regression model.

During the training phase, each of the sensors is assumed to be functioning properly. The steps can be iteratively applied until the model converges, as will be readily understood by one of ordinary skill in the art.

In the subsequent monitoring phase, the system 106 is monitored using the model trained during the training phase. During the monitoring phase new sensor values are supplied by the plurality of sensors 104a–d used to monitor the system 106 by sensing system outputs, which in the context of power generation can include such "outputs" as measured temperature, pressure, and vibration. The monitoring phase algorithmically comprises the following four steps:

Step 1:
For i=1,2, . . . N, initialize $w_i$ for each of the N sensors belonging to a group of correlated sensors such that $w_i$=1/N, i=1,2, . . . N.

Step 2:
Generate an estimated sensor value, $\hat{x}_k$, for each of the plurality of sensors.

Step 3:
For i=1,2, . . . N, update each $w_i$ based on the corresponding estimated sensor values, $\hat{x}_i$.

Step 4:
Repeat steps 2 and 3 until each of the estimated sensor values converges.

Figure 3:
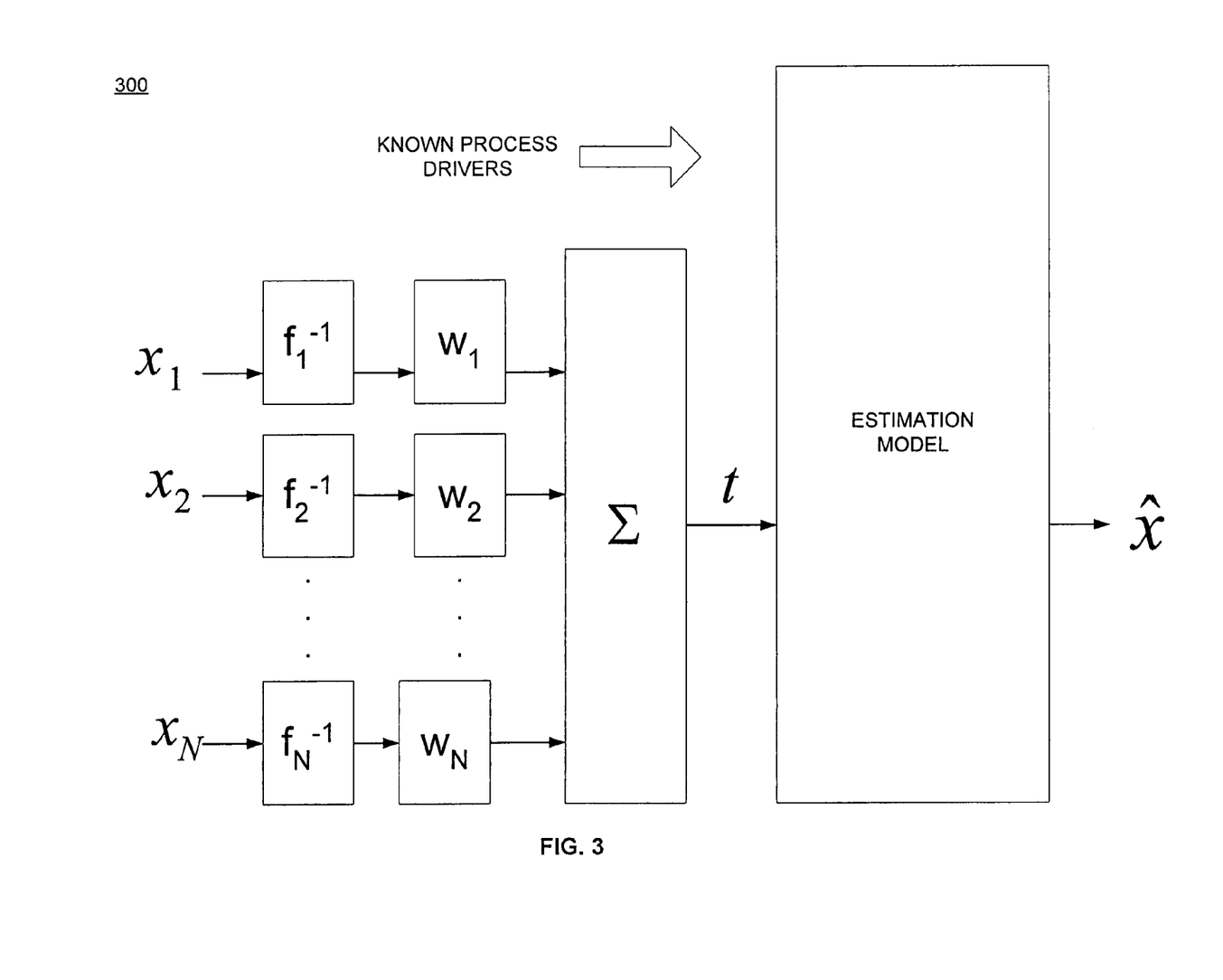
FIG. 3 is a schematic representation of the operations performed by a fault detection apparatus, according to another embodiment of the present invention.

FIG. 3 schematically summarizes the procedure 300 by which the hidden process driver is determined and by which a sensor estimate is obtained based upon the hidden process driver, t, and at least one known process driver. As illustrated, an inverse sensor function $f_i^{-1}$ is determined for each of the correlated sensors. A value of the hidden process driver is determined based on sensor value, $x_i$, supplied by each of the correlated sensors. A weighted average is computed based on the weights, $w_i$, corresponding to each of the correlated sensors, yielding the hidden process driver, t. The hidden process driver along with one or more known process drivers is supplied to the sensor estimating unit 204, which applies the trained regression model and generates an estimated sensor value based on the model.

According to one embodiment, the hidden process driver unit 202 includes additional circuitry and/or software instructions defining a function determining module. The module effectively determines a plurality of inverse sensor functions, each of the plurality of inverse sensor functions uniquely corresponding to a distinct one of the sensors belonging to the group of correlated sensors. Moreover, the function determining module can be configured to determine the plurality of inverse sensor functions based on at least one of a linear function, a quadratic function, and/or an exponential function.

According to another embodiment, the function determining module of the hidden process driver unit 202 can be configured to determine the plurality of inverse sensor functions based on at least one function having a non-parametric form. In addition, or alternatively, the function determining module can be configured to determine the plurality of inverse sensor functions by computing at least one parameter. According to yet another embodiment, the function determining module can be configured to determine the at least one parameter based upon at least one least-squares statistic.

According to still another embodiment, the hidden process driver unit 202 includes dedicated circuitry and/or software instructions defining a confidence weight determining module. The confidence weight determining module determines a plurality of confidence weights, each of which corresponds to a distinct one of the sensors belonging to the group of correlated sensors. The confidence weight determining module, according to one embodiment, iteratively determines the confidence weights by computing successive values for each confidence weight until the successive values converge.

Figure 4:
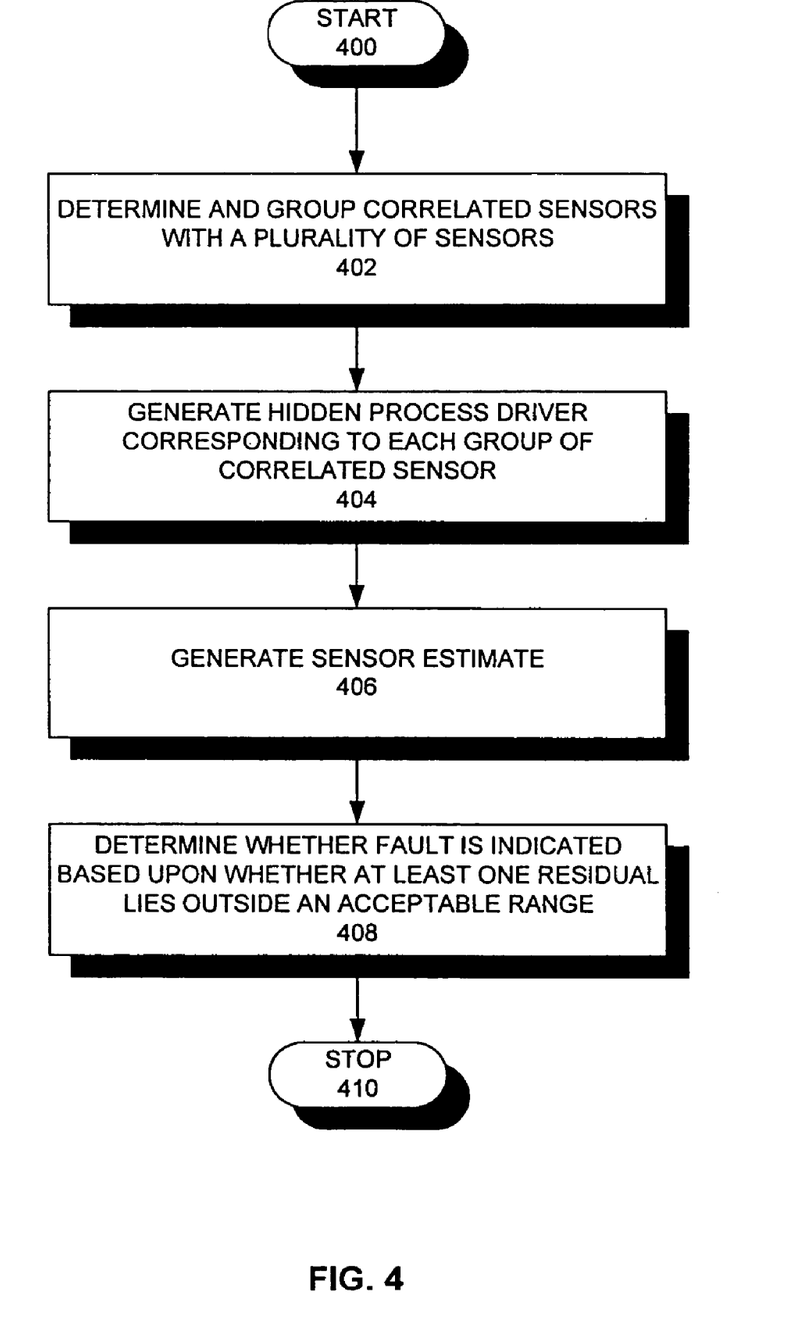
FIG. 4 is a flowchart of the exemplary steps of a computer-based method for detecting faults in a system, according to still another embodiment of the present invention.

A method for detecting faults in a power plant or other system, according to another embodiment of the invention, is illustrated by the exemplary steps of FIG. 4. The method 400 illustratively includes at step 402 grouping a plurality of sensors, each of which is communicatively linked to the system, into at least one group of correlated sensors. The grouping can be based upon a measure of correlation among the plurality of sensors. At step 404, the method 400 illustratively includes generating a hidden process driver for a group resulting from step 402. The process driver, more particularly, is generated based upon a functional relationship between the process driver and a set of sensor values produced by each of the correlated sensors.

The method 400 illustratively includes at step 406 generating a sensor estimate based upon at least one known process driver and the hidden process driver corresponding to the group of correlated sensors. The method 400 at step 408 further illustratively includes detecting a fault when a residual based on a difference between a sensor value produced by a particular one of the plurality of sensors and a sensor estimate corresponding to that particular sensor lies outside a predetermined range of acceptable residuals for the particular sensor. The method 400 illustratively concludes at step 410.

Figure 5:
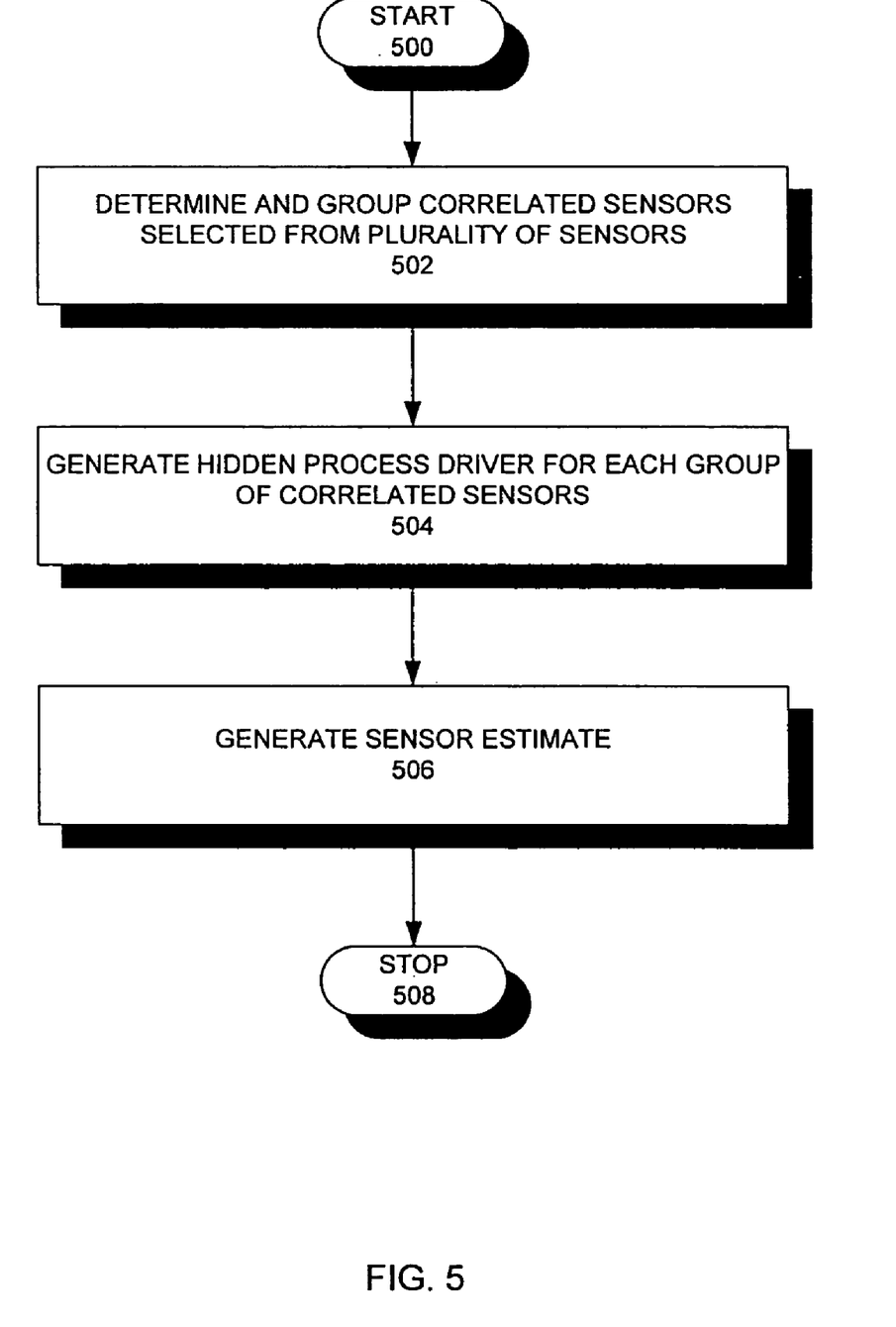
FIG. 5 is a flowchart of the exemplary steps of a computer-based method for estimating values of sensors used in a monitoring system, according to yet another embodiment of the present invention.

A method of estimating values of sensors used in monitoring a system, according to yet another embodiment, is illustrated by the exemplary steps of the flowchart of FIG. 5. The method 500 illustratively includes at step 502 grouping a plurality of sensors communicatively linked with the system so as to form at least one group of correlated sensors based upon a measure of correlation between the plurality of sensors. The method 500 also illustratively includes at step 504 generating a hidden process driver for the at least one group of correlated sensors based upon a plurality of inverse sensor functions and confidence weights. According to this embodiment, each of the plurality of inverse sensor functions and confidence weights uniquely corresponds to a different one of the group of correlated sensors. The method 500 further illustratively includes generating a sensor estimate at step 506 based upon at least one known process driver and the hidden process driver corresponding to the at least one group of correlated sensors. The method 500 illustratively concludes at step 508.

WORKING EXAMPLE

Figure 6:
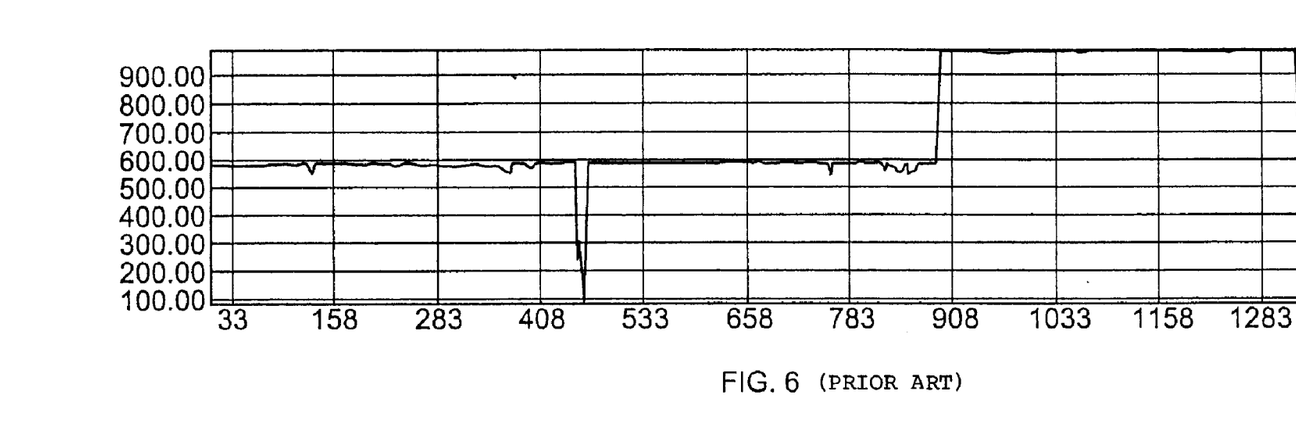
FIG. 6 is plot of sensor data generated by a faulty blade path temperature sensor.
Figure 7:
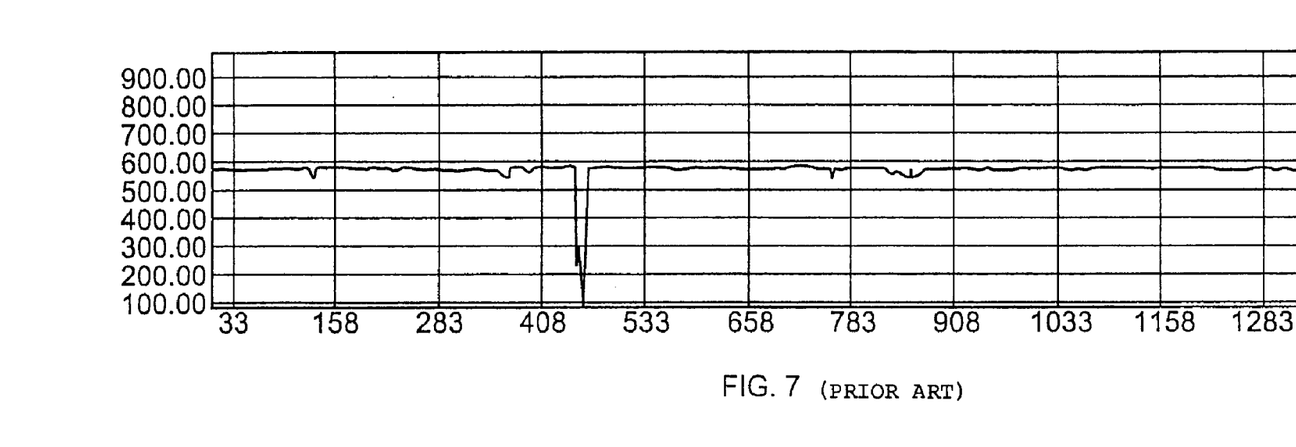
FIG. 7 is plot of sensor data generated by a well-functioning blade path temperature sensor.

As a working example, the procedures effected with the fault-detection apparatus 102 were applied to the Teesside, unit 2, power generator. The unit is typically monitored with 35 sensors for measuring different process drivers of the unit. Three of the sensors measure three known process drivers: gas flow, inlet temperature, inlet guide vane (IGV) actuator position. The remaining sensors are 32 correlated blade-path temperature sensors (BPTC1A, BPTC1B, BPTC2A, . . . , BPTC16B). A total of 1344 data points were generated based on sensor readings. The first 600 data points were used for the training phase and the remaining 744 data points were used for comparing a conventional sensor estimation of residuals with a sensor estimation of residuals generated with the present invention. The BPTC1A sensor was known to be faulty. FIG. 6 shows the estimated residuals generated based on a support vector regression (SVR) model for the BPTC1A. FIG. 7 shows the estimated residuals generated using the support vector regression (SVR) model for the BPTC9B sensor, which was known to be a well-functioning sensor. In general, there are 32 models, one for each BPTC sensor. As shown, the BPTC1A sensor values step up by +400 degrees between data point 900, the point at which a fault occurs, and data point 1344. Note that no such step up is evidenced by the well-functioning BPTC9B sensor.

Estimated residuals are obtained with the conventional procedure using inputs to the SVR model comprising the three known process drivers (i.e., gas flow, inlet temperature, and IGV actuator position) along with the sensor values for 31 of the PBTC sensors, on the basis of which is produced the estimated value for the remaining sensor.

Figure 8:
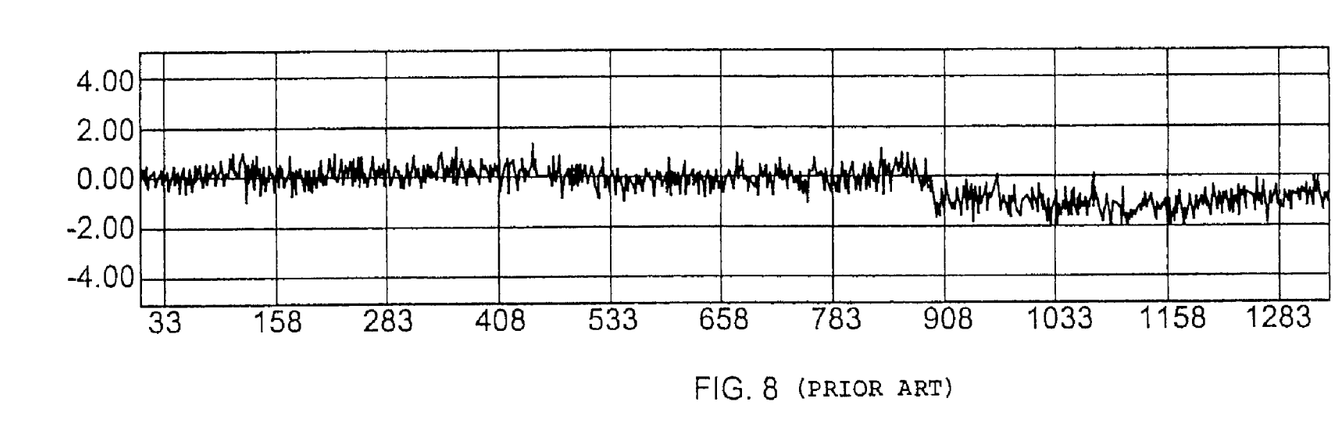
FIG. 8 is a plot of residuals computed from the output of a faulty blade path temperature sensor computed using a standard technique.
Figure 9:
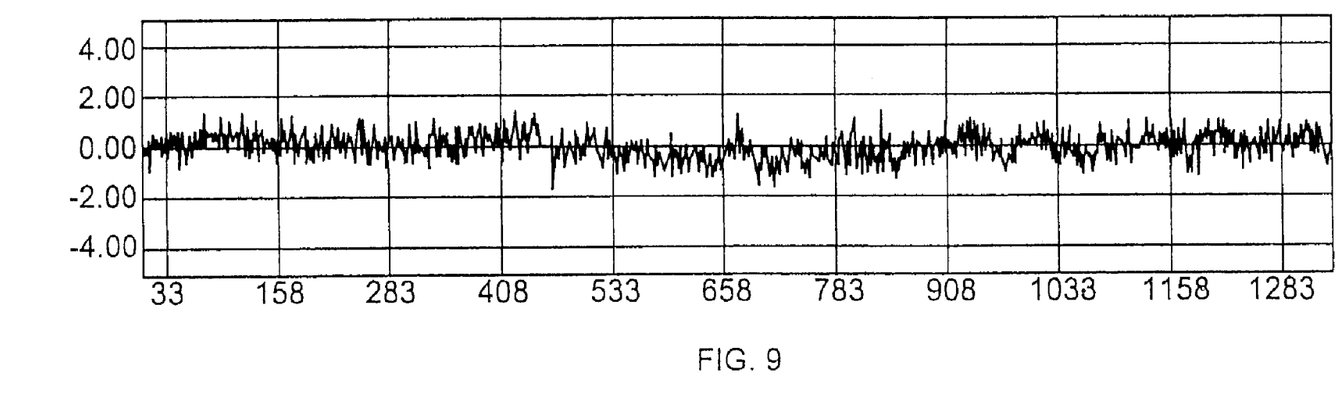
FIG. 9 is a plot of residuals computed from the output of a faulty blade path temperature sensor computed using according to one embodiment of the present invention.

By contrast, according to the present invention, the inputs to the SVR model comprise the three known process drivers and the hidden process driver corresponding to the group of correlated blade path temperature sensors. FIGS. 8 and 9 show the residuals for the BPTC9B using the conventional procedure and that of the present invention, respectively. As shown in FIG. 8, before data point 900 where the fault occurs, the residual for the PBTC9B is slightly smaller. After data point 900, there is a step down in the residual using the conventional procedure. By contrast, as shown in FIG. 9, using the procedure of the present invention, the residual remains relatively constant around the zero point.

The invention can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A computer-based method for detecting faults in a system, the method comprising:

grouping a plurality of sensors communicatively linked with the system into at least one group of correlated sensors based upon a measure of correlation between the plurality of sensors;

generating a hidden process driver for the at least one group of correlated sensors based upon a functional relationship between the hidden process driver and a set of sensor values produced by each of the correlated sensors;

estimating at least one parameter of the functional relationship based on a set of training data produced by the plurality of sensors, wherein estimating at least one parameter comprises estimating the at least one parameter based upon a least-squares regression on the set of training data;

generating a sensor estimate based upon the hidden process driver corresponding to the at least one group of correlated sensors and at least one known process driver;

detecting a fault when a residual based on a difference between a sensor value produced by a particular one of the plurality of sensors and a sensor estimate corresponding to that particular sensor lies outside a predetermined acceptable range of residuals for the particular sensor;

generating at least one response signal indicating the detected fault.

2. The method of claim 1, further comprising determining a non-parametric form of the functional relationship based upon a set of training data produced by the plurality of sensors.

3. The method of claim 1, wherein the functional relationship is defined by one of a linear function, a quadratic function, and an exponential function.

4. The method of claim 1, further comprising determining an inverse function for each of the plurality of correlated sensors based upon the functional relationship between the hidden process driver and the set of sensor values.

5. The method of claim 4, further comprising determining a plurality of confidence weights, each corresponding to a distinct one of the plurality of correlated sensors, and computing a weighted average based upon the confidence weights.

6. A computer-implemented method of estimating values of sensors used in monitoring a system, the method comprising:
grouping a plurality of sensors communicatively linked with the system into at least one group of correlated sensors based upon a measure of correlation between the plurality of sensors;
generating a hidden process driver for the at least one group of correlated sensors based upon a plurality of inverse sensor functions and confidence weights, each of the plurality of inverse sensor functions and confidence weights uniquely corresponding to a different one of the group of correlated sensors;
generating a sensor estimate based upon the hidden process driver corresponding to the at least one group of correlated sensors and at least one known process driver, wherein generating the sensor estimate comprises determining the sensor estimate upon a least-squares regression performed on a set of training data generated by the plurality of sensors; and
generating at least one control signal indicating the sensor estimate.

7. The method of claim 6, further comprising iteratively determining the confidence weights by computing successive values for each confidence weight until the successive values converge.

8. The method of claim 6, wherein at least one of the inverse sensor functions is an inverse function of at least one of a linear function, a quadratic function, and an exponential function.

9. The method of claim 6, wherein at least one of the inverse sensor functions corresponding to one of the group of correlated sensors is an inverse function of a function having a non-parametric form, and further comprising determining the non-parametric form based upon a plurality of segmented linear functions determined using the set of training data, wherein the set of training data is produced by the one of the group of correlated sensors to which the at least one inverse sensor function corresponds.

10. An apparatus for detecting faults in a system monitored by a plurality of sensors, the apparatus comprising:

a hidden process driver unit that generates at least one hidden process driver based upon sensor values received from at least one group of correlated sensors selected from among the plurality of sensors, wherein the hidden process driver unit comprises a function determining module that determines a plurality of inverse sensor functions, each of the plurality of inverse sensor functions uniquely corresponding to a distinct one of the sensors belonging to the group of correlated sensors, and wherein the function determining module is configured to determine the at least one parameter based upon at least one least-squares statistic;

a sensor estimating unit that generates at least one sensor estimate based upon the at least one hidden process driver and at least one known process driver provided by at least one uncorrelated sensor from among the plurality of sensors; and a fault determining unit that indicates a fault when a residual based upon a difference between a sensor value supplied by one of the plurality of sensors and a corresponding sensor estimate lies outside a predetermined acceptable range of residual values.

11. The apparatus of claim 10, wherein the function determining module is configured to determine the plurality of inverse sensor functions based upon at least one of a linear function, a quadratic function, and an exponential function.

12. The apparatus of claim 10, wherein the function determining module is configured to determine the plurality of inverse sensor functions based on at least one function having a non-parametric form.

13. The apparatus of claim 10, wherein the function determining module is configured to determine the plurality of inverse sensor functions by computing at least one parameter.

14. The apparatus of claim 10, wherein the hidden process driver comprises a confidence weight determining module that determines a plurality of confidence weights, each of the plurality of confidence weights corresponding to a distinct one of the sensors belonging to the group of correlated sensors.

15. The apparatus of claim 14, wherein the confidence weight determining module iteratively determines the confidence weights by computing successive values for each confidence weight until the successive values converge.

* * * * *